United States Patent
Flanagan (10) Patent No.: US 9,250,311 B2
(45) Date of Patent: Feb. 2, 2016

(54) ASYNCHRONOUS WIRELESS COMMUNICATION SYSTEM

(75) Inventor: Michael Joseph Flanagan, Chester, NJ (US)

(73) Assignee: JDSU UK Limited, Berkshire (GB)

( * ) Notice: Subject to any disclaimer, the term of this patent is extended or adjusted under 35 U.S.C. 154(b) by 173 days.

(21) Appl. No.: 13/145,617

(22) PCT Filed: Jan. 9, 2010

(86) PCT No.: PCT/EP2010/000073
§ 371 (c)(1),
(2), (4) Date: Sep. 19, 2011

(87) PCT Pub. No.: WO2010/083943
PCT Pub. Date: Jul. 29, 2010

(65) Prior Publication Data
US 2011/0319100 A1      Dec. 29, 2011

Related U.S. Application Data

(60) Provisional application No. 61/146,485, filed on Jan. 22, 2009.

(51) Int. Cl.
*H04W 24/00* (2009.01)
*G01S 5/02* (2010.01)
*H04W 64/00* (2009.01)

(52) U.S. Cl.
CPC .............. *G01S 5/021* (2013.01); *H04W 64/006* (2013.01)

(58) Field of Classification Search
None
See application file for complete search history.

(56) References Cited

U.S. PATENT DOCUMENTS

| 5,293,642 | A | 3/1994 | Lo | |
|---|---|---|---|---|
| 2002/0183075 | A1 | 12/2002 | Fauconnier | |
| 2003/0069024 | A1* | 4/2003 | Kennedy, Jr. | H04W 64/00 455/456.1 |
| 2006/0014548 | A1* | 1/2006 | Bolin | H04W 64/00 455/456.1 |
| 2006/0239391 | A1 | 10/2006 | Flanagan | |
| 2008/0113672 | A1* | 5/2008 | Karr et al. | 455/456.1 |
| 2008/0274750 | A1* | 11/2008 | Carlson et al. | 455/456.1 |

(Continued)

FOREIGN PATENT DOCUMENTS

| CA | 2 600 700 A1 | 8/1999 |
|---|---|---|
| WO | 2004/095868 A2 | 11/2004 |
| WO | WO 2005/002124 A2 | 1/2005 |

OTHER PUBLICATIONS

Nortel Networks: "UE Positioning with OTDOA-IPDL", R4-011306, Jul. 4, 2002, 8 Pages.
Qualcomm Europe: "On OTDOA in LTE", R1-090353, Jan. 8, 2009, 8 Pages.

(Continued)

*Primary Examiner* — Dai A Phuong
(74) *Attorney, Agent, or Firm* — Harrity & Harrity, LLP (57) ABSTRACT

The invention relates to an asynchronous wireless communication system, such as a UMTS system. The various base stations of an asynchronous wireless communication system do not typically have known timing offsets Tb(i), and these timing offsets vary with time. The invention allows the calculation of the difference dTb(i,j) between timing offsets Tb(i), Tb(j) for pairs of base stations B(i), B(j), using the timing of signals received by one or more wireless communication units. Having eliminated the timing offsets between the base stations as a variable, geo-location techniques from synchronous networks may then be used to locate wireless communication units in the asynchronous wireless communication system.

20 Claims, 5 Drawing Sheets

(56) References Cited

U.S. PATENT DOCUMENTS

| | | | | |
|---|---|---|---|---|
| 2008/0287116 | A1* | 11/2008 | Drane et al. | 455/423 |
| 2009/0286552 | A1* | 11/2009 | Wu | G01S 5/021 455/456.2 |
| 2011/0317570 | A1* | 12/2011 | Likar | G01S 1/68 370/252 |
| 2012/0052835 | A1* | 3/2012 | Bull et al. | 455/404.2 |

OTHER PUBLICATIONS

Notification of First Office Action, including English Translation of Text Portion of the Notification of counterpart Chinese Application No. 201080013348.4 issued by The State Intellectual Property Office of the People's Republic of China on Dec. 4, 2013.

European Search Report of counterpart EP Application No. 13157556.5-1854 /2605605 issued by the European Patent Office dated May 27, 2013.

* cited by examiner

ASYNCHRONOUS WIRELESS COMMUNICATION SYSTEM

CROSS-REFERENCE TO RELATED APPLICATION

This application claims priority under 35 U.S.C. §119 to U.S. Provisional Application No. 61/146,485, filed Jan. 22, 2009, the entire disclosure of which is incorporated herein by reference.

FIELD OF THE INVENTION

Aspects of the invention relate to the determination of base station timing differences in an asynchronous wireless communication system, and to the geo-location of wireless communication units in an asynchronous wireless communication system. The invention is applicable to asynchronous mobile telephone networks, but is not limited to these networks.

BACKGROUND OF THE INVENTION

A wireless communication unit usually forms part of a wireless communication system. The wireless communication unit communicates through a wireless communication network, which also forms part of the wireless communication system.

An example of a wireless communication unit is a mobile telephone in a mobile telephone system. The terms 'mobile communication unit' and 'wireless communication unit' are often used interchangeably. However, the term 'wireless communication unit' may comprise a wide variety of devices, such as laptops and personal digital assistants that can communicate wirelessly.

The wireless communication network normally comprises a network of base stations. Each base station enables communication within an area referred to as a cell-footprint. Each cell-footprint may comprise multiple sectors. There are usually three sectors served by one base station. Each sector may be served by a dedicated antenna, co-located with the base station.

The term 'communicating' includes a variety of forms of communication. These forms include, but are not limited to, speech or data communication sessions on traffic channels, and communication on the control channel. So, for example, a communication in a mobile telephone network may not require the user of a mobile telephone to actually place or receive a call. Instead, the communication may involve only the intermittent receipt by a mobile telephone of data, for example over the wireless communication system's control channel.

Typically, many wireless communication units move around. Information about the location of a wireless communication unit is commonly referred to as 'geo-location' information. Geo-location information can be derived in many ways. In particular, various forms of measurement information can be processed to provide an estimate of the location of the wireless mobile communication unit.

At any particular time, different forms of measurement information may be available from:
 (i) The wireless communication unit;
 (ii) The wireless communication network, and particularly from one or more base stations with which the wireless communication unit is communicating; or
 (iii) Both of (i) and (ii).

Considering the measurement information in more detail, this information may be available either:
 (i) Directly. This means that the measurement information is included in the measurement made. The measurement may be made either by the wireless communication unit, or by another part of the wireless communication system, such as the wireless communication network.
 (ii) Indirectly. This means that the measurement information is derived from the measurements made. An example would be an estimate of the distance between a wireless communication unit and the base station of a wireless communication system. Such an estimate might be calculated by multiplying the speed of propagation of the signal by a measured time difference between transmission and receipt of a signal.

Wireless communication networks fall into two broad categories:
 (i) Synchronous networks, such as Code Division Multiple Access systems, e.g. CDMA 2000. In synchronous networks, the timing offset between different base stations is constant. The amount of the offset is known to wireless mobile communication units that are using the network. In the example of CDMA2000, the timing offset is both known and constant, because each base station's timing is locked to a Global Positioning System satellite.
 (ii) Asynchronous networks, such as the Universal Mobile Telephone System (UMTS). In asynchronous networks, the timing offset between different base stations is not constant. Wireless mobile communication units in asynchronous networks are not provided with information about the timing offset between base station timing references. In addition, these references drift over time, relative both to absolute timing references, as well as to each other.

In a synchronous wireless communication network, timing information may be used for measuring the geo-location of a wireless communication unit. In order to understand this, it is first necessary to consider the relationship between distance and time for a signal passing from a base station to a wireless communication unit.

This relationship can be expressed in an equation, which is of the form of equation [1] below:

$$\text{Distance} = (\text{Speed of light}) \times [(\text{Measured time}) - (\text{Timing offset})] \quad [1]$$

Where:

'Distance' is the distance from the base station to the wireless communication unit.

'Measured time' is the amount of time that the communication appears to have taken to travel from the base station to the wireless communication unit. The measured time may be the difference between a time stamp embedded in the communication by the base station and an absolute reference time at which the wireless communication unit receives the communication. The absolute reference might be the correct time for the time zone in which the base station is located.

'Timing offset' is the amount of time by which the timing reference of the base station differs from the absolute reference.

Equation [1] can be re-arranged and then re-written as equation [2] below:

$$Tm = T\text{path} + Tb \quad [2]$$

Where:

Tm is the 'Measured time'

Tpath is the ratio of 'Distance'/(Speed of light). This is the time it takes a radio signal to travel the path from the base station to the wireless communication unit.

Tb is the base station 'Timing offset', the amount of time by which the timing reference of the base station differs from the absolute reference.

Figure 1:
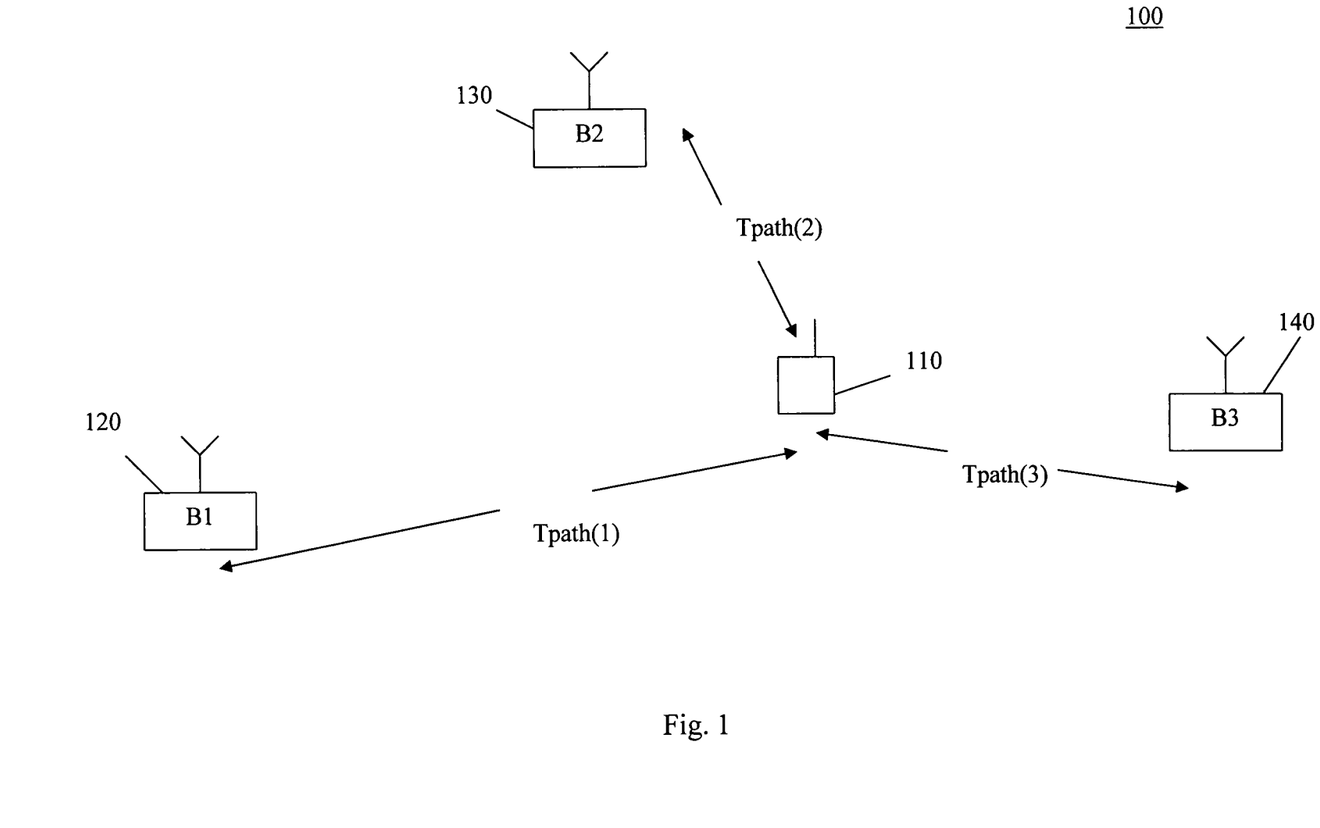
FIG. 1 illustrates geo-location in a prior art wireless communication network.

FIG. 1 illustrates one technique that can be used to perform geo-location in a prior art mobile communications network 100.

FIG. 1 shows a wireless communication network 100. Wireless communication network 100 may be either a synchronous or an asynchronous network. FIG. 1 also illustrates various values of Tpath. FIG. 1 shows a first base station B1, see reference 120, a second base station B2, with reference 130, and a third base station B3, with reference 140. Wireless communication unit 110 is able to receive signals from all three base stations.

The time taken for signals to reach wireless communications unit 110 from base station B1 is Tpath(1). The time taken for signals to reach wireless communication unit 110 from base station B2 is Tpath(2). The time taken for signals to reach wireless communication unit 110 from base station B3 is Tpath(3).

Base station B1 has a timing offset Tb(1) relative to the absolute reference, which is the true local time. Base station B2 has a timing offset Tb(2) relative to the absolute reference. Base station B3 has a timing offset Tb(3) relative to the absolute reference.

Using these parameters, it is possible to apply equation [2] to signals received by wireless communications unit 110 from each of the three base stations. The resulting equations are the following set of equations [3]-[5]:

$$Tm(1)=T\text{path}(1)+Tb(1) \quad [3]$$

$$Tm(2)=T\text{path}(2)+Tb(2) \quad [4]$$

$$Tm(3)=T\text{path}(3)+Tb(3) \quad [5]$$

Tm is measured by the wireless unit 110 in each case. Tm may be calculated, for example, by taking the difference between a time stamp embedded in the communication from a base station, and an absolute reference time at which the wireless communication unit 110 receives the communication. Tm is therefore known.

If wireless communication network 100 is a synchronous network, the offset timing values for each base station are known and constant. So each of Tb(1), Tb(2) and Tb(3) is known.

Using the measured values for Tm(1), Tm(2) and Tm(3), it is therefore possible to solve each of equations [3]-[5] above for the values of Tpath(1), Tpath(2) and Tpath(3).

Using the relation Tpath. 'Distance'/(Speed of light), each of the three Tpath values can be turned into a measurement of the distance from the wireless communication unit 110 to each base station.

Possession of this distance information allows for the geo-location of subscribers using a variety of well-known techniques. In a real wireless communication network, a mixture of relative and absolute distance information is likely to be available. However, if wireless communication network 100 is an asynchronous network, then the values of Tb(1), Tb(2) and Tb(3) are likely to be unknown, and to vary over time. This prevents solution of the equations [3]-[5].

So in an asynchronous network, it is much more difficult to derive a measurement of the location of a wireless communication unit from signal timing information. Geo-location techniques that are used in synchronous networks cannot be applied directly to asynchronous wireless communication systems. In effect, the lack of a known and constant timing offset Tb for each base station deprives these techniques of a key piece of information. This can greatly limit geo-location accuracy in asynchronous networks. In real networks of the prior art, this problem is usually considered insoluble.

Prior art Canadian patent application CA2600700 (A1) does describe a 'Method and system for facilitating timing of base stations in an asynchronous CDMA mobile communications system'. In the arrangement of CA2600700 (A1), the determination of the perceived timing offset between base stations is necessary to support communications objectives. This allows two base stations to send the same information to a mobile, so that it arrives at the same time. The information concerned might be, for example, a portion of speech. This is always done on a mobile-by-mobile basis, and the information or results from one mobile do not influence any operations at a different mobile. CA2600700 describes how the calculation of this timing can be done at one or more mobiles.

Prior art United States patent application US2006239391 (A1) describes 'Evaluating base station timing in an asynchronous network'. In this arrangement, base station timing is determined. However, this determination requires prior knowledge of the locations of the mobiles.

Prior art International patent application WO2005002124 (A2) describes a 'Method for sparse network deployment accuracy enhancements'. The approach provides location information. It relies on received power levels from different cell sites, which asynchronous systems will make available. In general terms, the mobile is expected to be closer to strongly-received cell sites, and further away from weakly-received cell sites. These assumptions can be fair approximations, under some special circumstances. However, a precise geo-location strategy will be limited, due to highly-variable signal fading effects. An example of such an effect would be that commonly experienced inside buildings. When a user is inside a building, one cell site may appear weaker than another, due to different numbers of brick walls lying in the signal paths to each cell site. As a consequence, equidistant cell sites may provide very different signal strengths to the user in the building. A measurement of distance based on received and transmitted signal powers is therefore of limited applicability.

SUMMARY OF THE INVENTION

In accordance with a first aspect of the present invention, there is provided a method for determining the differences between base station timing offsets in an asynchronous wireless communication system, in accordance with claim 1. In accordance with a second aspect of the present invention, there is provided an asynchronous wireless communication system in accordance with claim 11. In accordance with a third aspect of the present invention, there is provided an asynchronous wireless communication system in accordance with claim 12. In accordance with a fourth aspect of the present invention, there is provided an asynchronous wireless communication system in accordance with claim 13. In accordance with a fifth aspect of the invention, there is provided a computer program product in accordance with claim 14.

The invention enables the estimation of the timing offsets dTb(i,j) of pairs of base stations B(i),B(j) in an asynchronous wireless communication system, using the records of communications made by wireless communication units. These communications may be calls made by mobile telephones in an asynchronous mobile telephone system, such as a UMTS system.

The invention may be applied to successive sets of records of communications, each made over a predetermined length of time in the asynchronous wireless communication system. This approach provides up-to-date estimates of the timing offsets dTb(i,j) of the pairs of base stations B(i),B(j).

The timing offsets dTb(i,j) of pairs of base stations B(i),B(j) may be used to geo-locate wireless communication units in the wireless communication network. This geo-location may be performed with various geo-location techniques that, in the prior art, were normally only used in synchronous wireless communication systems.

The invention allows the tracking of base station timing offsets. These offsets generally drift over time. The tracking information does not require monitoring circuitry in the base stations, but instead can be derived from records of data collected by wireless communication units during their normal operations within the wireless communication system.

In the prior art, accurate timing measurements are often viewed as coming from network analyzer equipment. However, the invention allows the derivation of network timing information from one or more wireless communication devices, even if the devices suffer from noise. While any one wireless device measurement is intrinsically noisy, the use of many measurements in concert permits a 'processing gain'. As a result of this gain, the timing offset(s) may be estimated in an accurate manner.

BRIEF DESCRIPTION OF THE DRAWINGS

Exemplary embodiments of the present invention will now be explained with reference to the accompanying drawings.

DESCRIPTION OF PREFERRED EMBODIMENTS

The present invention allows an estimation of the timing offset of base stations in an asynchronous telecommunications network. The present invention may provide an estimation of timing offsets even in asynchronous telecommunications systems, such as UMTS, with timing offsets that are initially unknown, and which change over time.

Normally, a wireless communication unit can 'observe' more than one base station at any given time, i.e., the mobile can receive signals from more than one base station. Equations of the form of [2] and [3]-[5] above can therefore be constructed for the signals received from each base station.

When a wireless communication unit can receive signals from two base stations simultaneously, the wireless communication unit has two measurements available for the 'measured time' Tm. Taking the difference between any two such measurements yields an equation of the form of equation [6] below.

$$dTm = Tm1 - Tm2 = dTpath + dTb \qquad [6]$$

Where:

'd' indicates a difference

Tm1 and Tm2 are the 'Measured times' that radio signals appear to have taken to travel from the first and second base stations, respectively, to the wireless communication unit.

dTpath is the difference in the values of Tpath for the signals from the first and second base stations.

dTb is the difference between the 'Timing offsets' Tb of the first and second base stations.

As an example, we can apply equation [6] to the signals received by wireless communication unit 110 from base stations B1 and B2 in FIG. 1. This yields equation [7] below:

$$dTm = [Tpath(1) - Tpath(2)] + [Tb(1) - Tb(2)] \qquad [7]$$

Importantly, the dTpath value derived from signals received from any two base stations is a function of the wireless location, but is independent of the timing offsets Tb.

In addition, dTb is independent of the wireless location. The value of dTb will be the same for measurements made by all wireless communication units that are in communication with the same pair of base stations.

If dTb can be determined, then it can be used to find dTpath, because dTm can be measured by the wireless communication unit.

Once dTpath is known, this opens the possibility of using a wide variety of geo-location techniques that are suitable for use in synchronous wireless communication systems. This is possible, because dTb is then no longer an unknown variable in the calculation.

In addition, the above technique can be generalized across any number of base station pairs that a wireless communication unit observes. A wireless communication unit may well be able to receive signals from six base stations at any particular time. In prior art networks, signal strength information from the six base stations is used to determine the correct time and new serving base station for call hand-off. However, the invention can take advantage of the presence of signals from multiple base stations to calculate values of dTb.

We can generalise the above case to say that a wireless communication unit is able to receive signals from a set of base stations B1, B2, B3, . . . . Bi . . . Bn. Here 'i' is the ith base station, and n is the total number of base stations visible to that wireless communication unit. As stated above, n can be as large as 6, depending on the propagation environment.

The n base stations from which one wireless communication unit can receive signals at any one time are in fact only some of the base stations in the wireless communication network. We can call the total number of base stations in the network m. So the whole network comprises the following base stations:

B1, B2, B3, . . . Bi . . . Bn . . . Bm.

In a typical large network, m might be 1000 base stations.

A wireless communication unit is able to receive signals for each of the pairs of base stations Bi, Bj of the set B1, B2, B3, . . . . Bi . . . Bn. Each pair of measurements by a wireless communication unit from a pair of base stations Bi, Bj provides a value of dTm, which we can refer to as dTm(i,j).

So for any pair of base stations Bi,Bj that are visible from a wireless communication unit, equation [6] can be re-written to express the value of dTm(i,j) as equation [8] below:

$$dTm(i,j) = Tm(i) - Tm(j) = [Tpath(i) - Tpath(j)] + [Tb(i) - Tb(j)] \qquad [8]$$

For the case of n=6, one wireless communication unit can therefore derive the following list of values of dTm(i,j):

dTm(1,2); dTm(1,3); dTm(1,4); dTm(1,5); dTm(1,6);
dTm(2,3); dTm(2,4); dTm(2,5); dTm(2,6);
dTm(3,4); dTm(3,5); dTm(3,6);
dTm(4,5); dTm(4,6);
dTm(5,6).

The above list may be derived each time that the wireless communication unit makes a measurement of the signals that it is able to receive. Typically, such a measurement occurs when the wireless communication unit is involved in a call. If one wireless communication unit makes several calls, then the resulting measurements will provide several lists of dTm measurements such as those shown above. The wireless communication unit may make the calls from a variety of locations, in which case dTpath will differ both for each measurement, and for each call.

Figure 3:
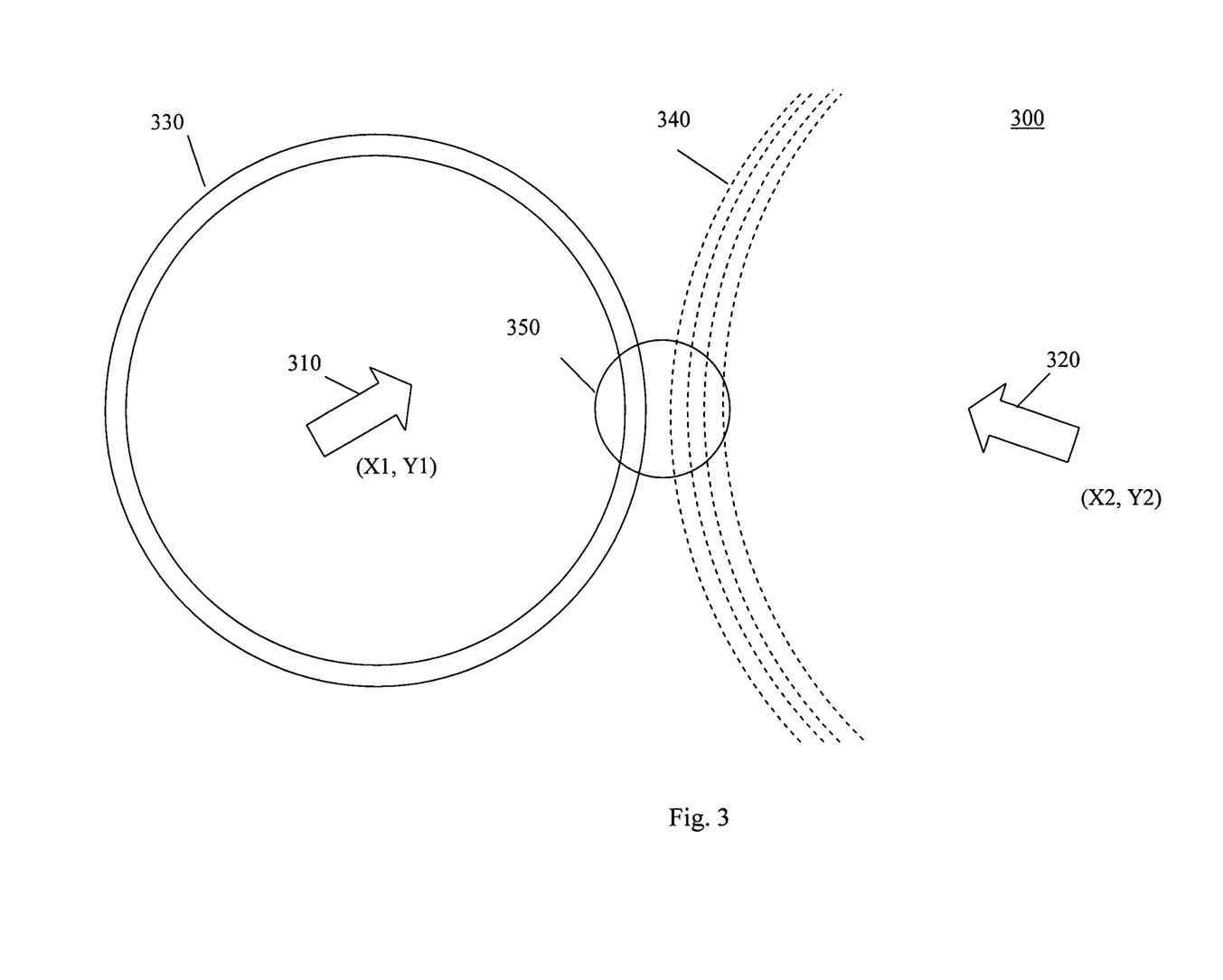
FIG. 3 shows a method of geo-location, when applied to a wireless communications network in which an estimate of base station timing is incorrect.
Figure 4:
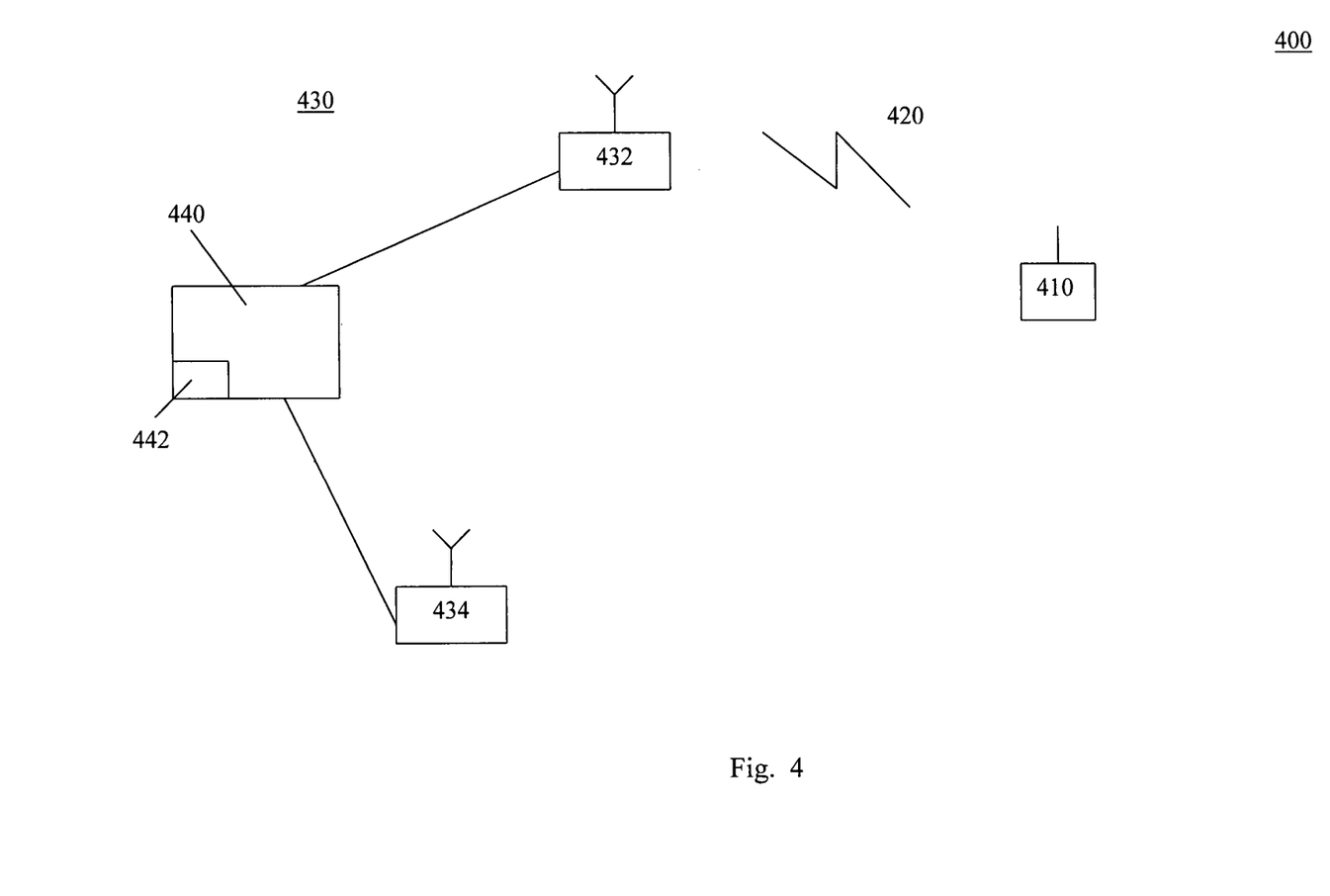
FIG. 4 shows an exemplary embodiment of a wireless communication system in accordance with the invention.

For each list of dT(i,j) measurements, it is possible to construct a confidence measure. The confidence measure can, in turn, be used to weight the importance of each measurement. To understand how this is done, FIGS. 2 and 3 explain how inaccuracies arise in location estimations in a wireless communication network. FIGS. 3 and 4 show how a confidence measure can be used.

Figure 2:
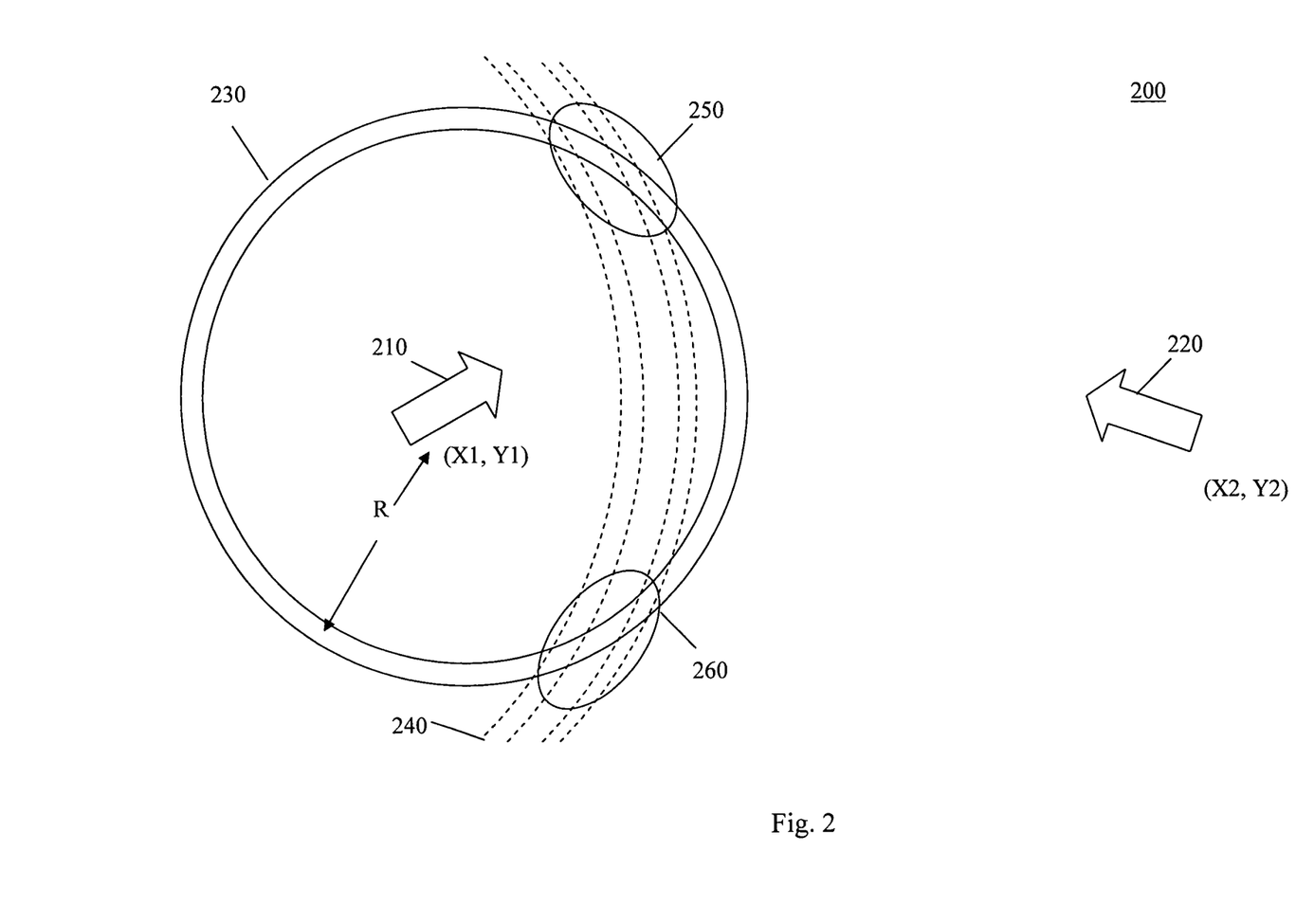
FIG. 2 shows a method of geo-location that can be used in a wireless communication network.

FIG. 2 shows two antennae in a wireless communications network 200. Antenna 210 is located at point X1, Y1. Antenna 220 is located at point X2, Y2. Antennae 210 and 220 each serve a different sector of the wireless communications network 200. The pointing angles of the antennae 210, 220 are also shown.

A wireless communication unit is located somewhere in communications network 200, and is able to receive signals from antennae 210, 220.

FIG. 2 shows a method of geo-location that can be used in a synchronous wireless communications network.

Geo-location outputs for each call made by a wireless communication unit are in the form of a probability distribution function (PDF). In the exemplary embodiment of FIG. 2, there are two probability distribution functions:

(i) A circle 230. Circle 230 is centered about the access base station with an antenna 210 located at coordinate (X1,Y1). Circle 230 has radius R. R corresponds to the access propagation delay from antenna 210 to the wireless communication unit. Circle 230 therefore corresponds to all points at which the time delay Tm measured by a mobile unit in contact with antenna 210 has a particular value.

(ii) A hyperbola 240. Hyperbola 240 has foci corresponding to the locations of antenna 210 at (X1,Y1) and antenna 220 at (X2,Y2), and the dTpath value. Hyperbola 240 is derived by a Time Difference of Arrival measurement between two signals received at the wireless communication unit. One signal is received from antenna 210. The other signal is received from antenna 220.

The wireless communication unit therefore has two independent measurements available to it, each with its own probability density function.

The probability density function for the location of the wireless communication unit is a combination of the probability density functions represented by circle 230 and hyperbola 240. The combined probability density function is such that the maximum value occurs in the upper oval, reference 250. There is also a second oval, reference 260, where circle 230 and hyperbola 240 intersect. However, the maximum value of the probability density function is in the upper oval 250, because this is where:

(i) The circle and hyperbola intersect; and
(ii) Where both antennas point.

The maximum value of the probability density function occurs somewhere close to the centre of oval 250. We can use the maximum value as a measure of 'confidence'.

FIG. 2 provides a simple illustration of how two different measurements of the location of a wireless communication unit can be combined. However, the approach in FIG. 2 is dependent on the reliability of the available measurements.

FIG. 3 shows a situation that might occur if there were an error in the value of dTb. Antennae 310 and 320 correspond broadly to the similarly numbered elements in FIG. 2. Circle 330 corresponds to circle 230 in FIG. 2. However, in the case of FIG. 3, there is an error in dTb. As a result, the dTpath value calculated from measurements made by the wireless communication unit is in error. As a result of the error in the dTpath value, hyperbola 340 does not intersect with circle 330.

This situation can be understood by looking at equation [6] above. Clearly, in equation [6], any error in dTb leads to an error in the value calculated for dTpath.

In FIG. 3, the maximum of the combined probability density function is now located in a new position. The maximum is in the centre of circle 350 in FIG. 3. However, the centre of circle 350 now lies neither on circle 330 nor hyperbola 340.

The maximum value of the combined probability density function is greatly reduced in magnitude, compared to that in FIG. 2, due to the poor overlap between hyperbola 340 and circle 330. The reduced maximum of the probability density function, and the poor overlap between the hyperbola and the circle, are caused by the error in the dTpath. The error in the dTpath is itself a consequence of the error in dTb.

FIG. 3 shows that a measurement of dTpath that is based on an incorrect value of dTb may be detectable by the presence of an unusually low maximum value for the probability density function. The invention therefore can use the maximum of the probability density function as a confidence measure, which acts as an indicator of measurements that may have been based on an incorrect value of dTb(i,j) for the two base stations concerned.

Starting from measurements such as those shown in FIGS. 2 and 3, and the confidence measures derivable from them, the method of the invention then allows the derivation of corrected values for dT(i,j).

The starting point for the method of the invention is a set of measurements of signals from pairs of base stations Bi,Bj. The set of measurements is derived from real calls, or other measurements made in a functioning wireless communication system. These measurements are obtained by wireless communication units in normal use, in the wireless communication system.

FIG. 4 shows a wireless communications system 400 in accordance with an exemplary embodiment of the present invention.

Wireless communication unit 410 is connectable via a wireless communication link 420 to a wireless communication network 430. Base stations 432 and 434, and control unit 440 all form part of wireless communication network 430. Wireless communication network 430 is part of wireless communication system 400. Communication link 420 may comprise a voice communication channel, a data link or a control channel.

Each base station 432, 434 provides signal coverage for a cell-footprint of the wireless communication network 430. Each base station 432, 434 may comprise three antennae, each antenna directed so as to cover one sector. The three sectors together cover the cell-footprint.

One of several of the components of the wireless communication system 400 may carry out the calculations needed to implement the invention. For example, a processor 442 located in control unit 440 may derive the probability density function and carry out other steps of the method.

In an alternative arrangement, the calculations may be derived in a separate system, which is not shown on FIG. 4. A dedicated system outside of wireless communication system 400 may comprise one or more computer workstations. These workstations may be dedicated to this task, which would be the usual approach. Alternatively, these workstations may perform other tasks, such as fault management or compiling switch statistics and maintenance reports, in addition to the present invention. These workstations may consist of general-purpose computers. However, they could also be composed of custom hardware, with specially-built printed-wiring cards & custom chips to accelerate the necessary calculations. Such a custom type arrangement may provide greater speed of implementation of the method.

In a typical large wireless communications system 400, there may be several thousand base stations 432, 434. There may be several million wireless communication units 410. There may be several million communications within the network in a typical 24 hour period.

Typically, a wireless communication unit 410 will be in contact with more than two sectors of a wireless communication network 430 at the time that it initiates or receives a call. As discussed earlier, such a wireless communication unit can measure a time difference $dTm(i,j)$ between base station pairs $Bi,Bj$, for all the base station pairs with which it is in contact.

In one exemplary implementation of the invention, the invention starts with a set of measurements made in the network over a ten minute period. The measurements might be, for example, all calls made in the wireless communications network in the period 0900-0910 (i.e. the period from nine o'clock in the morning until ten past nine). If there were a large number of calls in this period, then the invention may start by selecting a subset of these calls.

The invention would normally be arranged to provide an ongoing estimate of the differences $dTb(i,j)$ between base station timing offsets $Tb(i)$, $Tb(j)$, for pairs of base stations $B(i)$, $B(j)$. In order to provide an ongoing estimate, the method of the invention would be applied to call records from successive time intervals. So if the invention is applied first to measurements based on a set of calls made in the period 0900-0910, it might then be applied to a second set of calls made between 0910-0920, and then to a third set of calls made between 0920-0930. In this way, the invention can be used to look at sets of calls made 24 hours per day, seven days per week. An ongoing estimate of the differences $dTb(i,j)$ can therefore be made available. Each estimate may be made available as soon as possible after the completion of the time interval from which it was derived.

It is not necessary for the sets of calls to be grouped in consecutive periods. So, in another example, the first set of calls might be from the period 0900-0910, the second set of calls might be those made from 0901-0911, the third set from 0902-0912, etc.

The method derives a value for $dTb(i,j)$, the difference in timing offsets $Tb$ between the ith and jth base stations. Over a period as short as 10 minutes, in the example above, the values of the timing offsets $Tb$ for many of the base stations can be well approximated as constant. The time difference values $dTb(i,j)$ for many base station pairs $B(i)$, $B(j)$ are only likely to undergo modest changes, with only a few changing very substantially. A typical time interval for the offset timing $Tb$ of a base station to remain constant can vary from one minute to upwards of tens of minutes, depending on the degree of network timing stability.

In order to determine $dTb(i,j)$ for all base station pairs $Bi$, $Bj$ of interest over a specified interval of time, an iterative technique is employed. The technique has five main steps, as shown in Table 1 below. Further details of each step are provided after Table 1.

TABLE 1

Iterative determination of $dTb(i,j)$

| Step of Method | Main features of step |
|---|---|
| 1 | Starting from measurements of $dTb(i,j)$, for a given collection of pairs of base stations $Bi$, $Bj$ in a given time interval, determine $dTpath(i,j)$ for all measurements made by wireless communication units that were within range of the pair of base stations $Bi$, $Bj$. |
| 2 | Geo-locate all calls made during the time interval using the $dTpath(i,j)$ information from step 1. This geo-location information is then used to derive: (i) a confidence score for the probability density function for each call; and (ii) revised $dTpath(i,j)$ values. |
| 3 | For each call, determine the estimate of $dTb(i,j)$, based on the revised $dTpath(i,j)$ values. |
| 4 | Identify the necessary change in each $dTb(i,j)$ pair, based on a suitable measure taken from the $dTb(i,j)$ estimates across all calls. Each estimate should be weighted by the confidence scores for the estimate, derived from the probability density function for the call. |
| 5 | Either: (i) Go back to step 1; or (ii) Exit the iterative loop of steps 1-4. The method can exit the loop when either a sufficient degree of convergence has been reached, or the method has completed a predetermined maximum number of loops. |

By way of commentary on each step above:

Step 1: The starting collection of $dTb(i,j)$ values for pairs of base stations $Bi,Bj$ should be taken from the results of the method when it was applied to the previous interval of time under study. So if a record of calls between 1100-1110 hrs is to be analysed using the method in Table 1, then the starting collection of values for $dTb(i,j)$ values would be that found by the analysis of calls made in the preceding period 1050-1100. This approach works because the $dTb(i,j)$ values are generally fairly constant over such short time periods. If data is not available from any prior interval, then other techniques can be used to kick-start the iterations in step 1. While $dTb(i,j)$ values will drift over time, this drift rate tends to be slow compared to call origination rates. As such, the time interval width should be chosen to allow for reasonable tracking of this drift. As stated previously, a typical time interval can vary from one minute to upwards of tens of minutes, depending on the degree of network timing stability. Values of 1-100 minutes may be appropriate, depending on the particular network. The $dTb(i,j)$ values lead directly to $dTpath(i,j)$ values for each call through equation [6], i.e. by subtracting $dTb(i,j)$ from the measured time difference $dTm(i,j)$, for each call. It is likely that there will be a large number of $dTpath(i,j)$ values, given that the various wireless communication units using the base station pair $Bi,Bj$ would have been in many different locations.

Figure 5:
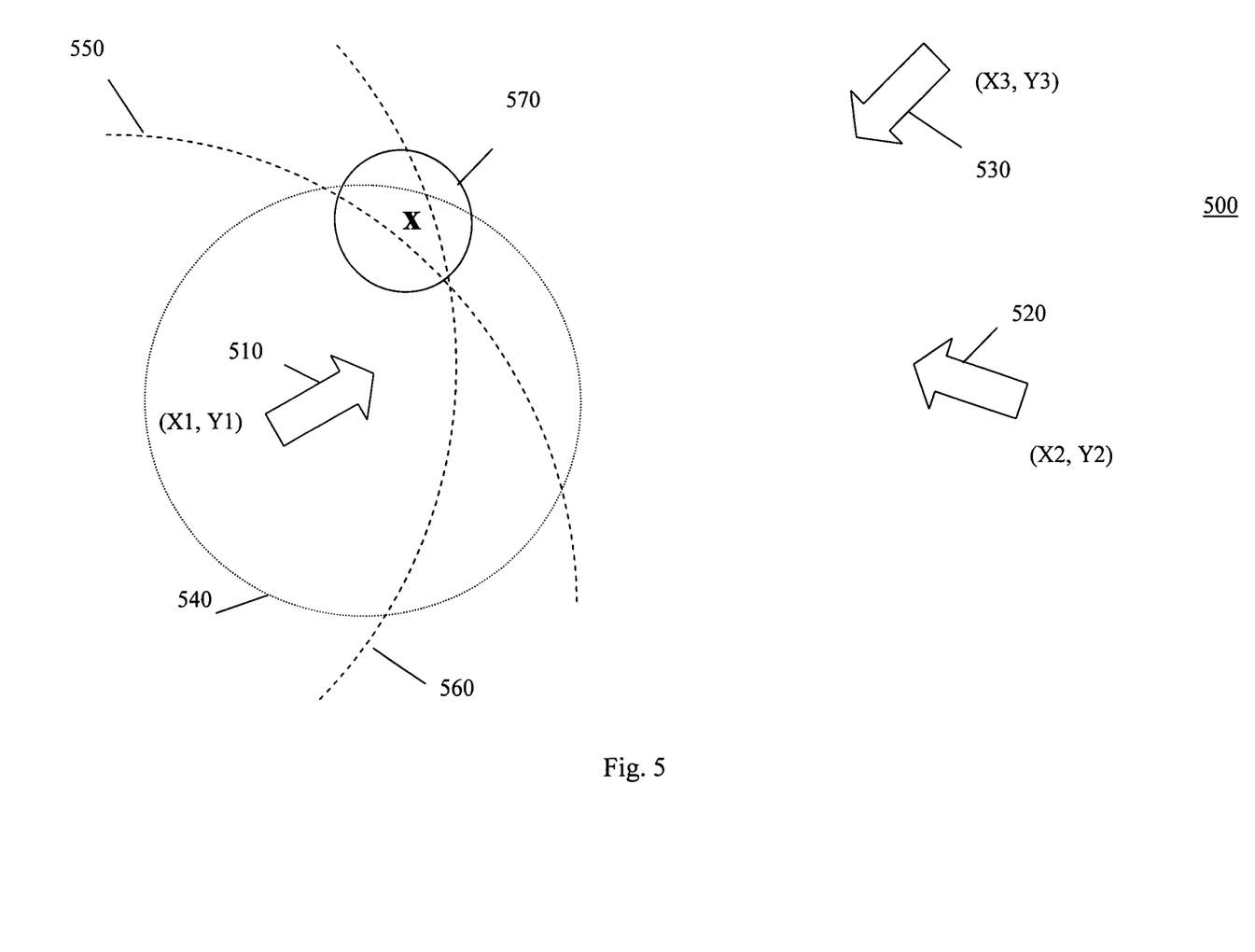
FIG. 5 shows one step in the method of the present invention.

Step 2: Geo-location using the $dTpath(i,j)$ values from Step 1 and other information can be done using any of a number of techniques. Typically, Time Difference of Arrival techniques will be used. One example of a geo-location technique that can be used is described in the U.S. provisional application entitled 'Geo-location in a wireless communication network', with filing date 13 Jan. 2009 and unofficial file reference 61/144,242, the details of which are herein incorporated by reference. Note that once geo-location is performed, there will generally exist new $dTpath(i,j)$ values. This situation is illustrated by FIG. 5. In FIG. 5, a wireless communications unit is able to receive signals from antennae 510, 520 and 530. Circle 540 and hyperbolae 550 and 560 show probability density functions, which do not intersect perfectly. As a result, an almost triangular shape describes the area in which the wireless communication unit is most likely to be located. That is the triangle generally lying within circle 570 marked on FIG. 5. The point 'X' at the centre of circle 570 corresponds to the point where the geo-location algorithm will likely locate the point of maximum likelihood. As a result, the distance from point X to each antenna provides new dTpath (i,j) values. The degree of intersection of the various shapes will drive the confidence score, as noted earlier. These new dTpath(i,j) values can be used in the next step of the method.

Step 3: New dTb(i,j) values can be calculated for each call in the set, using the new dTpath(i,j) values output from Step 2. The relation to be used is dTb=dTm−dTpath, which is a rearrangement of equation [6]. This provides a revised set of differences dTb(i,j).

Step 4: It is now necessary to look at all the revised dTb(i,j) values, from all the calls. Each estimate of dTb(i,j) can be weighted by the confidence score for the call. This reflects the fact that each call may have a somewhat different estimate for what a given dTb(i,j) should be. Higher confidence calls have higher impact on the new dTb value that will be derived. This is intuitively correct, because a measurement such as that in FIG. 2 is more likely to have been made on the basis of accurate dTb values than that shown in FIG. 3. Given this weighted distribution of dTb values, many different mathematical methods can be used to determine the most appropriate new value for dTb(i,j). Examples of possible approaches would be to take the median or average across the weighted input samples. Alternatively, a given percentile of the estimates may be chosen. Furthermore, any of a number of techniques can be considered, such as multi-dimensional gradient descent with suitable dampening factors, for the migration of the starting dTb(i,j) values in Step 1 towards the dTb(i,j) values determined in this step. In summary, the revised set of differences dTb(i,j) derived in step 3, weighted by the confidence scores, is used to make changes to the initial set of estimates of differences dTb(i,j).

Step 5: Using the new dTb(i,j) values from the output of Step 4, the process can continue back to Step 1. However, if a suitable degree of convergence has been achieved, then the iterative procedure can be stopped, until data from the next time interval of study is available. Similarly, the iterative procedure can be stopped after a desired number of iterations.

For the given interval under study, for example calls from 0900-0910, the output of the method in table 1 is a set of estimates of the timing offsets dTb(i,j) for each base station pair B(i), B(j). This information can be used for several purposes.

Geo-location of the wireless communication units 410 can now be made using these dTb(i,j) estimates, i.e. on the terminated output of step 5 of Table 1. Importantly, the geo-location can now be performed using geo-location approaches that would normally only be usable with synchronous networks. Effectively, the timing offset of each base station pair is no longer an unknown variable in the process of locating a wireless communications unit 410 with approaches based on equation [2].

Processor 442 of FIG. 4 may therefore be arranged to:
(i) receive measurements Tm(i), Tm(j) of the timing of signals received by one or more wireless communication units (410) from one or more pairs of base stations B(i),B(j);
(ii) calculate the differences dTb(i,j) between base station timing offsets Tb(i), Tb(j) for pairs of base stations B(i), B(j);
(iii) iteratively correct the differences dTb(i,j) to derive a final set of differences dTb(i,j); and
(iv) apply a synchronous geo-location technique to the final set of differences dTb(i,j), to geo-locate one or more of the wireless communication units (410).

Table 2 below provides an example of the input and output values of dTb(i,j) for a simple example of a telecommunications network of four base stations. The left column indicates which base station pair the measurements relate to. The second column indicates the starting values for dTb(i,j), used as the input to step 1 of the method shown in table 1. The input values would normally be those resulting from the previous run of the method of table 1, for measurements made in the preceding period of interest. That preceding period might be 1050-1100 hours. The third column of table 2 indicates the output from step 5 of the method in table 1, for the current period of interest. The current period of interest might then be 1100-1110 hours. The time units employed in columns 2 and 3 of table 2 are 'chips'. These time units are typically of the order of 1 microsecond, or less, depending on the particular communication system. 'Chips', or suitable fractions of chips, are often employed as the time units for mobile timing measurements.

TABLE 2

| Values of dTb(i, j) for one run of the method | | |
|---|---|---|
| Base station pair Bi, Bj | Value of dTb(i, j) used as an input to the method (chips) | Value of dTb(i, j) provided as an output of the method (chips) |
| 1, 2 | 1 | 1 |
| 1, 3 | 2 | 2 |
| 1, 4 | 2 | 1 |
| 2, 3 | 1 | 1 |
| 2, 4 | 3 | 2 |
| 3, 4 | 4 | 3 |

In table 2, some of the dTb(i,j) values do not change between columns 2 and 3. However, the values of dTb(i,j) for the base station pairs 1,4; 2,4; 3,4 do change. The values shown in the table might be consistent with base station 4 slowing by 1 chip during the ten minute interval. However, the output of the method of table 1 is in fact a list of values of the time difference dTb(i,j), rather than values of Tb(i) for each base station B(i). Note that, more generally, fractional values can also be considered, such as a change from 1.1 chips to 1.5 chips.

When using the output data such as that in column 3 of Table 2, it is possible to simply apply the values of dTb(i,j) in the chosen geo-location method. However, it is also possible to apply a linear interpolation to each dTb(i,j) value. This might provide greater accuracy in estimating the location of some calls in, for example, a ten minute period. With linear interpolation, a call made towards the beginning of the ten minute interval would be geo-located on the basis of dTb(i,j) values that were little changed from those shown in column 2 of table 2. However, a call made towards the end of the ten minute interval would be geo-located on the basis of dTb(i,j) values that were much closer to those shown in column 3 of table 2.

Table 3 provides detailed examples of some of the parameters that may be calculated using the method of table 1. These detailed parameters show one exemplary application of the method of table 1 to a simplified portion of a wireless communications network.

Table 3 is concerned only with three base stations, B(1), B(2) and B(3). Furthermore, 'Mobile 1' and 'Mobile 2' are the only two wireless communication units for which calls are recorded in the time period of interest. The time period of interest might, for example, be a 15 minute interval. The situation in table 3 is designed to illustrate principles that can be applied in a real wireless communication network, for far larger numbers of base stations, wireless communication units and communications.

TABLE 3

Parameters that may be calculated using the method of Table 1.

| Information from call records | | | | | | | |
|---|---|---|---|---|---|---|---|
| | | Base station pair | Step 1 | | Step 2 | | Step 3 |
| Mobile number | Call number | Bi, Bj; dTm(i, j) | Initial dTb(i, j) | dTpath(i, j) = dTm(i, j) − dTb(i, j) | Confidence score | Revised dTpath(i, j) | Revised dTb(i, j) |
| Mobile 1 | 1 | 1, 2; dTm(m1, c1, 1, 2) | A | T(m1, c1, 1, 2) | 0.8 | T(m1, c1r, 1, 2) | A(m1, c1r) |
| | | 1, 3; dTm(m1, c1, 1, 3) | B | T(m1, c1, 1, 3) | | T(m1, c1r, 1, 3) | B(m1, c1r) |
| | | 2, 3; dTm(m1, c1, 2, 3) | C | T(m1, c1, 2, 3) | | T(m1, c1r, 2, 3) | C(m1, c1r) |
| | 2 | 1, 2; dTm(m1, c2, 1, 2) | A | T(m1, c2, 1, 2) | 0.6 | T(m1, c2r, 1, 2) | A(m1, c2r) |
| Mobile 2 | 1 | 1, 2; dTm(m2, c1, 1, 2) | A | T(m2, c1, 1, 2) | 0.5 | T(m2, c1r, 1, 2) | A(m2, c1r) |
| | | 1, 3; dTm(m2, c1, 1, 3) | B | T(m2, c1, 1, 3) | | T(m2, c1r, 1, 3) | B(m2, c1r) |
| | | 2, 3; dTm(m2, c1, 2, 3) | C | T(m2, c1, 2, 3) | | T(m2, c1r, 2, 3) | C(m2, c1r) |

The top row of table 3 shows the stage of the method in which the parameters are developed. The first part of the top row of table 3 entitled 'Information from call records' indicates data that is found in the call records from the wireless network, together with time differences dTm(i,j) calculated from timing measurements Tm(i), T(j). The step numbers 1-3 in the remaining part of the top row of table 3 correspond to the first three steps in table 1 above. Detailed comments about the entries in each individual column of table 3 are provided below, under the headings 'Information from call records', 'Step 1', 'Step 2' and 'Step 3'.

Information from Call Records:

Columns 1-3 of table 3 contain data from the call records. Data is shown in the table for only two mobiles. Mobile 1 makes two calls in the period of interest, and mobile 2 makes one call.

When mobile 1 made its first call, it was able to receive signals from each of base stations 1-3. It therefore has available timing measurements Tm for pairs of signals from pairs of base stations 1,2; 1,3; 2,3. The time difference measurements dTm are written in the form:

dTm(mobile number, call number, first base station, second base station). So the time difference measurement dTm (m1,c1,1,2) is the time difference dTm for Mobile 1 'm1', making its first call 'c1', and receiving signals from base stations '1' and '2'.

When mobile 1 made its second call, it was able to receive signals from only base stations 1 and 2. It therefore has available timing measurements Tm only for signals from the pair of base stations 1,2.

When mobile 2 made its first call, it was able to receive signals from each of base stations 1-3. It therefore has available timing measurements Tm for pairs of signals from pairs of base stations 1,2; 1,3; 2,3.

Step 1: The fourth column of table 3 lists the time difference values dTb(i,j) used as the starting values for the iterative process. So 'A' is the initial value of the time difference between base stations 1 and 2. 'B' is the initial value of the time difference between base stations 1 and 3.

The fifth column of table 3 shows the values of the difference in path distance times dTpath(i,j). This difference value is calculated from the difference between the timing values in the two preceding columns. The parameter in the fifth column is written in the format T(m1,c1,1,2). The bracketed variables are the same as for the dTm values in the third column.

Step 2: The sixth column of table 3 shows the confidence score derived for the location measurement for each call. The location measurement may be found by maximising the probability distribution function that is itself derived from the dTpath(i,j) values for the particular call. So the confidence value of 0.8 applies to the location estimation of mobile 1 that was made on the basis of data from base stations 1, 2 and 3 during the first call.

The seventh column of table 3 shows the revised values of dTpath(i,j). The format used in table 3 for these revised values is T(m1,c1r,1,2), where 'm1' indicates mobile 1, 'c1r indicates a revised value based on the first call by mobile 1, '1' is base station B(1), '2' is base station B(2). These revised values are the values of dTpath(i,j) that would have been calculated, if the mobile had been at the estimated location, which in this case means the point in the network where the probability density function is a maximum for the relevant call.

Step 3: Column 8 shows the revised values of dTb(i,j). These values are derived by using the revised values for dTpath(i,j) from column 7 in the relationship dTb=dTm−dTpath. The format used in table 3 for these revised values is A(m1,c1r), where 'm1' indicates mobile 1, and 'c1r' indicates a revised value based on the first call by mobile 1. Revised values of dTb(i,j) are calculated from the data for each call. However, the reliability of the values calculated from the data for each call is not the same. For some of the calls, the values of dTb(i,j) in column 4 that were used in the calculations will not have corresponded to the actual values in the network at the time that the call was made. This will lead to a lower value for the confidence score for the call in column 6 of table 3. So each revised value of dTb(i,j) in column 8 of table 3 needs to be interpreted in the light of the confidence score for the relevant call.

Table 3 does not go on to show the values derived as part of step 4 of the method of table 1. However, column 8 shows three revised values for dTb(1,2). These are:

A(m1,c1r) with confidence score 0.8;
A(m1,c2r) with confidence score 0.6;
A(m2,c1r) with confidence score 0.5.

The revised values for time difference dTb(i,j) shown in column 8 of table 3 are representative of a much higher number, for example many thousands of values, that might be calculated in a real network from call records spanning a period such as 15 minutes. The revised values for dTb(i,j) can be used in a wide variety of ways. A simple example would be to find the average of all the revised estimates of dTb(i,j) for each base station pair B(i), B(j), weighting the dTb(i,j) values by their confidence values. A threshold value for confidence might first be set, below which revised values for dTb(i,j) would not be used in the calculation.

Once the decision in step 5 of table 1 has been completed, the method of the invention provides a final set of difference values dTb(i,j).

A major use of the final set of dTb(i,j) values provided by the invention is in geo-location of the calls made during the period of interest. This is performed as part of a 'post-processing' operation. However, the geo-location data may be available very shortly after the period in which the call data was gathered.

Other uses of base station timing information are possible, and the invention is not limited simply to providing dTb(i,j) values for use in retrospective geo-location. For example, a reasonably up to date set of dTb(i,j) values will always be available, if the method is performed repeatedly on call records from multiple periods. These up to date dTb(i,j) values could be provided to a mobile wireless communication unit 410, which could then geo-locate itself in real time. Location information would then be available to a mobile wireless communication instantly, without waiting for the ongoing interval of gathering call data to end, and the method of table 1 to then be performed again. The accuracy of the geo-location that can be performed may be appropriate, for example, to satellite navigation purposes in a vehicle.

In an alternative arrangement, signal measurements could be gathered by a dedicated wireless mobile communication unit, or units. Such units could be adapted to roam within the wireless network, either rapidly making calls, or rapidly making measurements of signal timing for signals received from many base stations. Such dedicated units could be arranged to provide measurements of signal timing at a significantly greater rate than are provided by ordinary wireless communication units. The dedicated units could be optimised for rapid signal timing measurement by a variety of techniques, e.g. by measuring signal strength as often as possible, rather than only in readiness for a user to make calls. The dedicated units could be mounted on rapidly moving platforms, such as vehicles. The dedicated units would also not suffer periods where no measurements were gathered, since they would not be switched off in the way that many ordinary wireless communication units in a wireless communication network are likely to be, e.g. at night. Such a dedicated unit would emulate, to some degree, the calls that a large number of mobiles might make.

Note that instead of using all calls in the method of table 1, it is possible to use a suitably selected subset, such as a randomly chosen subset of all calls. This might be appropriate if too many calls were made in the time period of interest. If the method of the invention is to be carried out periodically, for example every hour, then the subset of calls might be the most recent calls for which data is available. These calls would yield values for dTb(i,j) that are most relevant to conditions prevailing in the network at the time that the invention is applied.

One approach to implementing the invention would be simply to arrange for each of a group of mobiles of a mobile telephone system to provide data as an 'input'. The mobile telephones would provide their measurements to the Radio Access Network (RAN) of the mobile telephone system, which in turn provides the mobile measurements to the Operations Support System (OSS) of the mobile telephone system. The calculations necessary to perform the invention would be carried out in the Operations Support System (OSS). The Operations Support System of a mobile telephone system is normally connected directly to the Radio Access Network (RAN), so can easily receive measurements from the Radio Access Network.

Either the Operations Support System or the processor 442 may therefore be arranged to convert measurements Tm(i), Tm(j) of the timing of signals received by mobile communication units 410 from one or more pairs of base stations B(i), B(j) into estimates of the locations of the one or more communication units 410, and use the estimates of the locations to refine a set of estimates of differences dTb(i,j) between base station timing offsets Tb(i), Tb(j).

The probability density function for the location of a wireless communication unit as shown in FIG. 5 may be derived from at least two individual probability density functions, each individual probability density function being based on either:

(i) the measurement information from the wireless communication unit 410; or (ii) network information about the wireless communication network 430.

Various techniques are available for calculating probability density functions. However, in accordance with the invention, the probability density function, or the two or more individual probability density functions may be created by parametric modelling, using one or more moments of a random variable distribution. The probability density function thus created will be such that the summation of the probabilities of all possible locations equals unity.

The spatial information and probability information about possible locations for the wireless communication unit may comprise:

(i) an x-coordinate and a y-coordinate for each possible location; and (ii) a probability of the wireless communication unit 410 being located at the x-coordinate and y-coordinate, the probability being derived from the probability density function.

It will be appreciated that, for clarity purposes, the above description has described embodiments of the invention with reference to different functional units. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. Aspects of the invention may optionally be implemented, at least partly, as computer software running on one or more data processors and/or digital signal processors. Thus, the elements and objects of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with embodiments of the invention.

Additionally, although individual features may be included in different claims, these may possibly be advantageously combined, and the inclusion in different claims does not imply that a combination of features is not feasible and/or advantageous. Also, the inclusion of a feature in one category of claim does not imply a limitation to this category, but rather the feature may be equally applicable to other claim categories, as appropriate.

The order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method comprising:
   obtaining, by a device, an initial set of estimates of differences between base station timing offsets for a pair of base stations;
   obtaining, by the device, measurements of a timing of first signals received by a wireless communication unit from the pair of base stations;
   using, by the device, the measurements to derive a first location estimate of the wireless communication unit;
   obtaining, by the device, a first current confidence score for the first location estimate;
   estimating, by the device, a difference in first path lengths for second signals and a difference in second path lengths for third signals received, by the wireless communication unit, from at least one of:
      another pair of base stations, or
      another wireless communication unit;
   determining, by the device and using the estimated difference in the first path lengths and the estimated difference in the second path lengths, a second location estimate of the wireless communication unit;
   using, by the device, the second location estimate to create a revised, estimated difference in the first path lengths and a revised, estimated difference in the second path lengths;
   using, by the device, the first location estimate, the revised, estimated difference in the first path lengths, and the revised, estimated difference in the second path lengths, to produce a revised set of estimates of differences;
   weighting, by the device, the revised set of estimates of differences based on the first current confidence score and a second current confidence score,
      the second current confidence score being associated with the second location estimate; and
   using, by the device, the weighted, revised set of estimates of differences to refine the initial set of estimates of differences.

2. The method of claim 1, further comprising:
   producing additional, revised sets of estimates of differences and weighting the additional, revised sets of estimates until:
      values of the additional, revised sets of estimates of differences converge, or
      the additional, revised sets of estimates of differences have been produced a particular quantity of times.

3. The method of claim 1, where the set of the measurements include measurements taken over a period of 1 minute to 100 minutes.

4. The method of claim 1, further comprising:
   using the refined, initial set of estimates of differences new, initial set of estimates for the of differences between the base station timing offsets;
   obtaining an additional, revised set of estimates of differences; and
   using the additional, revised set of estimates of differences to refine the new, initial set of estimates of differences.

5. The method of claim 1, further comprising:
   using the revised set of estimates of differences to provide a geo-location estimate for the wireless communication unit.

6. The method of claim 1, where the measurements are received by the wireless communication unit while the wireless communication unit communicates during a call associated with an asynchronous mobile telephone system.

7. The method of claim 1, where a first base station, of the pair of base stations, has a first timing offset relative to an absolute time,
   a second base station, of the pair of base stations, has a second timing offset relative to the absolute time, and
   the method further includes:
      measuring, for a first communication between the first base station and the wireless communication unit, a first amount of time for a signal to travel from the first base station to the wireless communication unit; and
      measuring, for a second communication between the second base station and the wireless communication unit, a second amount of time for a signal to travel from the second base station to the wireless communication unit,
      the first communication and the second communication occurring when the wireless communication unit is at a particular location.

8. The method of claim 7, further comprising:
   estimating a difference in path lengths for the first communication and the second communication using a formula:

$$dT\text{path} = (Tm1 - Tm2) + dTb(1,2)$$

where $dTb(1,2)$ is an initial estimate of a difference between the first timing offset and the second timing offset,
   where Tm1 is the first amount of time, and
   where Tm2 is the second amount of time.

9. The method of claim 8, where the second location estimate is obtained by deriving a probability density function for a particular location of the wireless communication unit,
   the probability density function being based on estimating the difference in the path lengths for the first communication and the second communication and an estimate of the particular location.

10. The method of claim 1, where the device is part of an asynchronous wireless communication system.

11. A non-transitory computer-readable medium storing instructions, the instructions comprising:
    one or more instructions which, when executed by a processor, cause the processor to:
       obtain an initial set of estimates of differences between base station timing offsets for a pair of base stations in an asynchronous wireless communication system;
       obtain measurements of a timing of first signals received by a wireless communication unit from the pair of base stations;
       use the measurements to derive a first location estimate of the wireless communication unit;
       obtain first current confidence score for the first location estimate;

estimate a difference in first path lengths for a second signal and a difference in second path lengths for third signals received, by the wireless communication unit, from at least one of:
  another pair of base stations, or
  another wireless communication unit;
determine, using the estimated difference in the first path lengths and the estimated difference in the second path lengths, a second location estimate of the wireless communication unit
use the second location estimate to create a revised, estimated difference in the first path lengths and a revised, estimated difference in the second path lengths;
use the first location estimate, the revised, estimated difference in the first path lengths, and the revised, estimated difference in the second path lengths, to produce a revised set of estimates of differences;
weight the revised set of estimates of differences based on the first current confidence score and a second current confidence score,
  the second current confidence score being associated with the second location estimate; and
use the weighted, revised set of estimates of differences to refine the initial set of estimates of differences.

12. The non-transitory computer-readable medium of claim 11, where the instructions further include:
one or more instructions to produce additional, revised sets of estimates of differences and weight the additional, revised sets of estimates until:
  values of the additional, revised sets of estimates of differences converge, or the additional, revised sets of estimates of differences have been produced a particular quantity of times.

13. The non-transitory computer-readable medium of claim 11, where the instructions further include:
one or more instructions to use the refined, initial set of estimates of differences as a new, initial set of estimates of differences between the base station timing offsets;
one or more instructions to obtain an additional, revised set of estimates of differences; and
one or more instructions to use the additional, revised set of estimates of differences to refine the new, initial set of estimates of differences.

14. The non-transitory computer-readable medium of claim 11, where the instructions further include:
one or more instructions to apply a synchronous geo-location technique to the weighted, revised set of estimates of differences to geo-locate the wireless communication unit.

15. The non-transitory computer-readable medium of claim 11, where
a first base station, of the pair of base stations, has a first timing offset relative to an absolute time,
a second base station, of the pair of base stations, has a second timing offset relative to the absolute time, and
the instructions further include:
  one or more instructions to estimate, using the first timing offset, the second timing offset, a first amount of time for a signal to travel from the first base station to the wireless communication unit, a second amount of time for a signal to travel from the second base station to the wireless communication unit, a difference in path lengths for a first communication and a second communication,
    the second location estimate being obtained based on estimating the difference in the path lengths for the first communication and the second communication.

16. An asynchronous wireless communication system, comprising:
one or more devices to:
  obtain an initial set of estimates of differences between base station timing offsets for a pair of base stations in an asynchronous wireless communication system;
  obtain measurements of a timing of first signals received by a wireless communication unit from the pair of base stations;
  use the measurements to obtain a first location estimate of the wireless communication unit;
  obtain a first current confidence score for the first location estimate;
  estimate a difference in first path lengths for a second signal and a difference in second path lengths for third signals received, by the wireless communication unit, from at least one of:
    another pair of base stations, or
    another wireless communication unit;
  determine, using the estimated difference in the first path lengths and the estimated difference in the second path lengths, a second location estimate of the wireless communication unit;
  use the second location estimate to create a revised, estimated difference in the first path lengths and a revised, estimated difference in the second path lengths;
  use first location estimate, the revised, estimated difference in the first path lengths, and the revised, estimated difference in the second path lengths, to produce a revised set of estimates of differences; and
  weight the revised set of estimates of differences based on the first current confidence score and a second current confidence score,
    the second current confidence score being associated with the second location estimate, and
    the weighted, revised set of estimates of differences being used to refine the initial set of estimates of differences.

17. The asynchronous wireless communication system of claim 16, where
a first base station, of the pair of base stations, has a first timing offset relative to an absolute time,
a second base station, of the pair of base stations, has a second timing offset relative to the absolute time, and
the one or more devices are further to:
  measure, for a first communication between the first base station and the wireless communication unit, a first amount of time for a signal to travel from the first base station to the wireless communication unit; and
  measure, for a second communication between the second base station and the wireless communication unit, a second amount of time for a signal to travel from the second base station to the wireless communication unit,
    the first communication and the second communication occurring when the wireless communication unit is at a particular location.

18. The asynchronous wireless communication system of claim 17, where
the one or more devices are further to:
  estimate, using the first timing offset, the second timing offset, the first amount of time, and the second amount of time, a difference in path lengths for the first communication and the second communication, and the second location estimate is obtained by deriving a function for a particular location of the wireless communication unit, the function being based on estimating the difference in the path lengths for the first communication and the second communication and an estimate of the particular location.

19. The asynchronous wireless communication system of claim 16, where the one or more devices are further to:
produce additional, revised sets of estimates of differences and weight the additional, revised sets of estimates until:
values of the additional, revised sets of estimates of differences converge, or the additional, revised sets of estimates of differences have been produced a particular quantity of times.

20. The asynchronous wireless communication system of claim 16, where the one or more devices are further to:
use the refined, initial set of estimates of differences as a new, initial set of estimates of differences between the base station timing offsets;
obtain an additional, revised set of estimates of differences; and
use the additional, revised set of estimates of differences to refine the new, initial set of estimates of differences.

* * * * *

UNITED STATES PATENT AND TRADEMARK OFFICE
CERTIFICATE OF CORRECTION

PATENT NO. : 9,250,311 B2  
APPLICATION NO. : 13/145617  
DATED : February 2, 2016  
INVENTOR(S) : Michael Joseph Flanagan Page 1 of 1

It is certified that error appears in the above-identified patent and that said Letters Patent is hereby corrected as shown below:

Claims

Please correct Claim 4 as follows:

Column 17, line 65, after "estimate of differences" insert -- as a --.

Please correct Claim 11 as follows:

Column 19, line 10, after "communication unit" insert -- ; --.

Signed and Sealed this  
Tenth Day of May, 2016

Michelle K. Lee  
*Director of the United States Patent and Trademark Office*